United States Patent [19]
Haldeman

[11] 3,789,659
[45] Feb. 5, 1974

[54] ELECTROMECHANICAL DYNAMOMETER SYSTEM

[75] Inventor: Charles W. Haldeman, Lexington, Mass.

[73] Assignee: Megatech Corporation, Belmont, Mass.

[22] Filed: Nov. 2, 1971

[21] Appl. No.: 194,953

[52] U.S. Cl. .................................. 73/134, 73/117.3
[51] Int. Cl. ............................................. G01l 3/10
[58] Field of Search 73/133, 134, 116, 117.3, 136 R

[56] References Cited
UNITED STATES PATENTS

| | | | |
|---|---|---|---|
| 1,477,474 | 12/1923 | Bogardus | 73/134 |
| 1,635,980 | 7/1927 | Highfield et al. | 73/134 X |
| 1,892,295 | 12/1932 | Walker | 73/134 L |
| 2,130,900 | 9/1938 | Presbrey | 73/134 |
| 2,298,076 | 10/1942 | Whiting | 73/134 |
| 2,785,367 | 3/1957 | Roman et al. | 73/134 X |

OTHER PUBLICATIONS

N. J. Deenik, Instrumentation, Vol. 18, No. 2, 1965, pp. 4–7.

*Primary Examiner*—Charles A. Ruehl
*Attorney, Agent, or Firm*—Charles Hieken; Jerry Cohen

[57] ABSTRACT

An electromechanical dynamometer instrument system especially suitable as a laboratory and educational tool may be used selectively as engine starter motor, highly stable dynamic loader dynamometer, and electrical machine demonstrator and comprises a rotating electrical machine with a direct current power supply, field coil polarity reversing switch, armature range switch, engine speed measurement device, cylinder peak pressure measurement device, and manifold peak suction measurement device when the instrument is used with a compression type engine such as a reciprocating internal combustion engine.

11 Claims, 2 Drawing Figures

PATENTED FEB 5 1974

3,789,659

ELECTROMECHANICAL DYNAMOMETER SYSTEM

BACKGROUND OF THE INVENTION

The present invention relates in general to electrical dynamometers and more particularly concerns a novel dynamometer system suitable for use not only in demonstrating and measuring the performance of an associated transparent educational internal combustion engine, but also in starting it. Electrical dynamometer systems are well known as devices for measuring and regulating the performance of engines and motors. The prior art dynamometers include mechanical, electrical nd electromechanical types. Electromechanical dynamometers generally comprise a generator machine coupled to the output shaft of an engine to be tested. The interacting magnetic fields of the field coil and armature coil of the generator can be used to brake the engine shaft and obtain regulating and/or measurement signals.

It is an object of the invention to provide an electromechanical dynamometer system having high stability.

It is a further object of the invention to provide a dynamometer system having capabilities of serving as a starter motor for an engine to be tested and as a d.c. electrical machine demonstrator, consistent with the foregoing object.

It is a further object of the invention to provide an apparatus which affords reliable operation consistent with the foregoing objects.

It is a further object of the invention to provide a low-cost, simple apparatus, consistent with the foregoing objects.

It is a further object of the invention to provide a dynamometer instrument and/or dynamometer instrument-engine combination useful as a teaching and study tool, consistent with the foregoing objects.

DETAILED DESCRIPTION

Figures 1, 2:
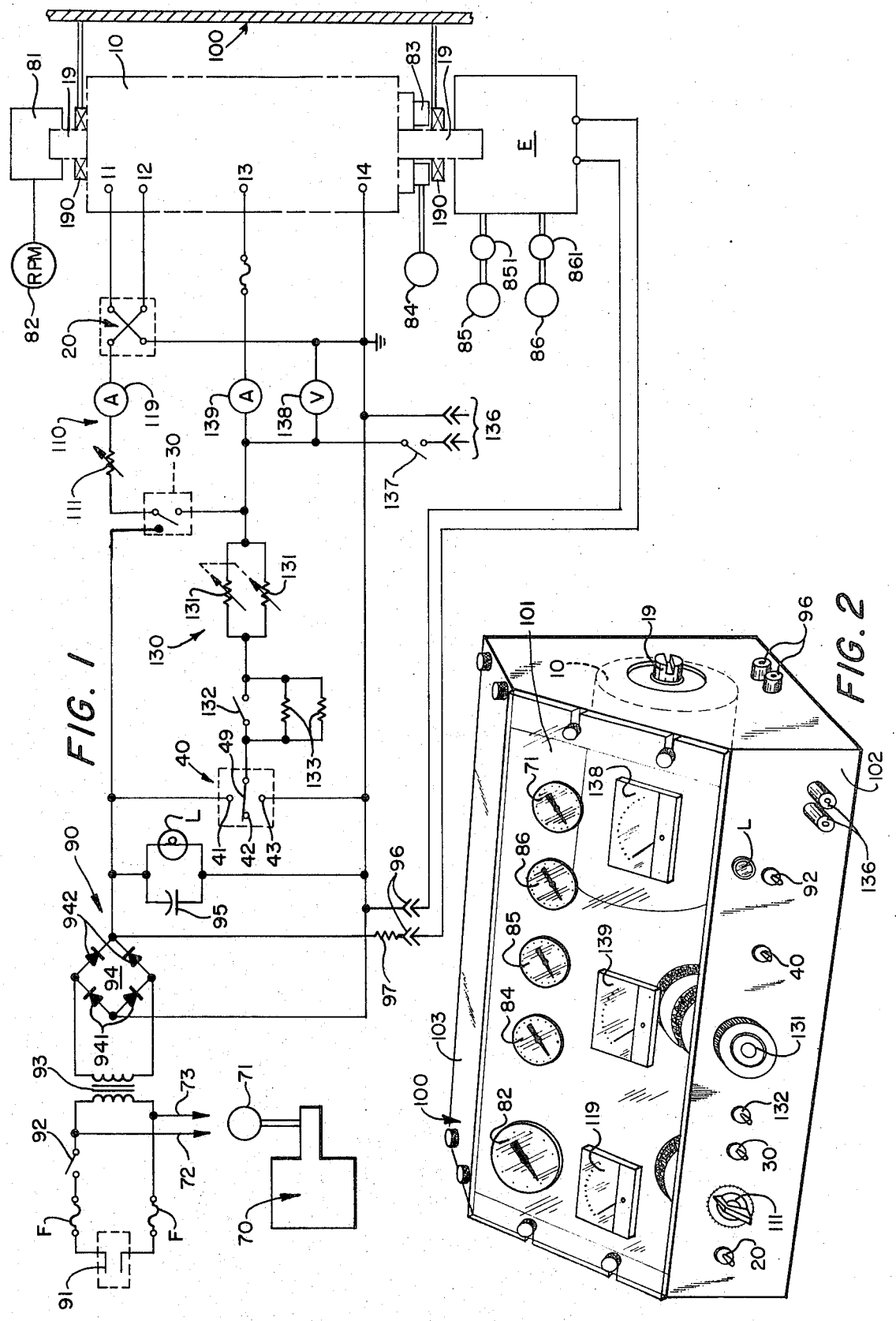
FIG. 1 is an electric circuit schematic diagram of the apparatus.
FIG. 2 is an isometric sketch of a preferred embodiment of the instrument illustrating the controls, meters and internal construction view available to the student user.

Referring to FIG. 1 there is shown an electric schematic diagram of a preferred embodiment of the invention. The apparatus comprises a modified rotating electrical machine 10, with field and armature coils such as a standard 12-volt automotive generator, having an output shaft 19 connected to an engine E under test. The machine 10 is mounted in a sheet metal cabinet 100, a portion of which is shown in FIG. 1, which forms a housing for the instrument. The manner of mounting is that bearings 190 are mounted on the instrument housing and shaft 19 is rotatably mounted in the bearings. The housing of machine 10 is free to rotate except for limits described below in connection with load cell 83. Terminals 11 and 12 are connected to the field and terminals 13 and 14 to the armature with terminal 14 connected to ground. A pole reversing switch is provided at 20 to reverse the polarity of the field coils between torque + and torque -positions.

A power supply is provided at 90, comprising an AC power cord (for use with a 120 volt, 60 cycle, A.C. outlet) with a plug, an on-off power switch 92, a transformer 93 and a bridge rectifier 94, utilizing two diodes 941, which may be, 1N1184 diodes, and two diodes 942, which may be 1N1184R diodes and a capacitor 95, which may be a 1000 microfarad, 40 volt capacitor. Six volt D.C. outlet terminals 96 can be tapped from the power supply utilizing resistor 97 (2 ohms, 50 watts). This can be supplied to the electric terminals of the engine under test, thus serving as the engine's "battery."

A switch 30 is provided for selectively setting the machine 10 on internal or external excitation, in connection with use as a generator.

GENERAL SUMMARY OF THE INVENTION

An electrical machine, such as an automobile generator, having field and armature coils arranged to provide interacting electromagnetic fields, has its field coil connected to a source of d.c. electric power via a polarity reversing switch to selectively establish plus (+) or minus (−) torque. The machine has an armature shaft connected to an engine to be regulated or analyzed. The armature coil is selectively connectable to the power source via a switch and has adjustable load and range resistors in circuit therewith. An internal-external excitation switching arrangement and meters for armature coil current and voltage, field current, engine speed, torque, manifold suction and cylinder pressure are provided.

The apparatus is arranged so that it can serve to start the engine under test with the electrical machine run as a motor to provide mechanical cranking power and with the internal power supply being tapped to provide electric power for the engine ignition function.

In one switched arrangement of the apparatus, the electrical machine provides braking torque to the engine shaft for dynamometer action. The torque so provided can be proportional to speed when the switching leaves the generator on external excitation. In another switched arrangement, providing internal excitation to the generator, the torque will be proportional to speed squared.

The instrument of the invention is usable with compression engines generally and particularly with an internal combustion engine.

Other objects, features and advantages of the invention will be apparent to those skilled in the art and the following detailed description of a preferred embodiment of the invention, which is to be read together with the accompanying drawings wherein:

A mode switch 40 is provided for selectively setting the machine at Off, Start and Load positions; when switchblade 49 touches terminal 41, this is "start" position, when 49 touches 42, this is "off;" and when 49 touches 43, this is "load" (dynamometer) position. A field rheostat (0-10 ohms, 100 watts) is provided at 111 and an ammeter is provided at 119 for measuring field current. Ganged rheostats (0-1 ohm, 225 watts) are provided at 131 for adjusting armature current and dissipating generated electric energy in the absence of external loading, and an armature range switch 132 (with two 1 ohm, 225 watt, resistors 133) is provided to adjust armature current and a volt-meter at 138 to measure armature voltage. Terminals 136 tap into the armature circuit to provide a 0-14 volt D.C. generator output with an On-off Switch at 137. This provides adequate power to run automobile headlamps or like loads.

A tachometer 81 is connected to the machine shaft and provides an engine speed reading at meter 82 (in revolutions per minute, preferably over a range of 0–3500 r.p.m.). A load cell 83 (described below) measures torque on the shaft to give a reading at meter 84 (0 to 30 inch pounds).

Pressure and vacuum gauges 85, 86 are connected to an engine cylinder and its manifold via appropriate check valves 851 and 861, respectively, to provide readings to cylinder pressure and manifold pressure (suction). The ranges are 0 to 160 pounds per square inch for cylinder pressure and suction of 0 to 30 inches Hg.

An air compressor is provided at 70 to cool the instrument, and it can have a meter indicative of a cooling parameter (e.g., pressure meter 71 indicating air coolant line pressure of 0 to 60 pounds per square inch). The compressor has an electric motor operator which may have its own power cord to tap into the instrument at lines 72, 73.

The load cell arrangement indicated at 83 for measuring torque utilizes the following features:

a. The housing of machine 10 is floated — that is, it is freely mounted about its armature shaft 19 in low friction ball-bearings (not shown). The shaft 19 itself is mechanically mounted from the instrument cabinet via bearings 190.

b. A collar or other detent extending from the machine housing bears against a load cell which is simply a piston in a cylinder transmitting a pressure signal to pressure gauge 84 via a fluid medium which connects them — preferably Dow Corning's No. 200 fluid having a viscosity of 5000 centistokes to damp oscillations and prevent leakage around the load cell piston.

c. A stop acts on the same collar or detent from the machine, or another one, to prevent the housing from rotating in the opposite direction. Alternatively, a similar load cell can be provided to measure torque in the other direction.

The constraints provided by a load cell-stop or double load cell arrangement prevent the otherwise-free-to-rotate machine housing from rotating.

FIG. 2 shows the instrument in the above-mentioned sheet metal cabinet 100 with a removable transparent upper front plate 101 of machinable grade (made of polycarbonate or plexiglas sheet). The plate 101 is angled between a vertical front plate 102 and a horizontal top plate 103.

Meters 82, 84, 85, 86, 71, 119, 139, 138 are mounted in the plate 101. Toggle-form switches are mounted in the lower front plate 102 to serve as switch elements 20, 30, 132, 40, 92. Rheostats 111 and 131 are also mounted in the plate 102. The terminals 136 are made available in the front plate for connection to a variety of auxiliary loads, and terminals 96 are provided on a side or rear panel.

The electrical machine 10 has its shaft 19 emerging through a side panel for connection to an engine.

The student can see the relation of his actions to machine control. As he turns the respective knobs therefor, he can see the adjustments he makes on rheostats 111, 131. At the same time, he can observe changes in readings of the meters.

The engine E is preferably a one horsepower or less demonstration-type internal combustion engine of light weight with at least one transparent cylinder head. Such a component could be the one-third horsepower Megatech Corporation's Mark III brand engine — a commercially available unit. The Mark III has cylinder and manifold port connections for the necessary pressure gauges. In using some other engines without such connections, it may be necessary to drill and tap the ports.

The instrument component ratings set out above in connection with the discussion of FIG. 1 are scaled to use with a small engine on the order of 1 horsepower, and zero to 3 foot pound torque ratings. In applying the instrument of FIGS. 1–2 to a larger engine, its component sizes would be scaled up correspondingly as will be readily apparent to those skilled in the art.

The instrument may be provided as a separate element or in combination with an engine.

While the instrument has its best use with a reciprocating internal combustion engine of the kind described above (or various rotary equivalents thereof), it can be used with other compression engine affording at least one discrete compression/expansion compartment (or other discrete compression/expansion compartment, which is included in the usage of "cylinder" herein) and a manifold (or other chamber communicating with the cylinder(s) such as a carburetor, which undergoes suction as a function of engine operation, all such chambers being comprehended by the usage of "manifold" herein). The engine could also be a non-compression engine, such as a windmill or turbine.

Another example of permissible apparatus variations affording at least some of the advantages of the present invention is to use a single ammeter in place of the two meters 119, 139 of FIGS. 1–2 and provide appropriate switching for field current and armature current measurements, or eliminate field current measurements.

The instrument cabinet may be a simple relay rack mount with only a front panel, instead of the preferred full enclosure of FIG. 2 and some parts can be omitted from the cabinet — e.g., any or all of the cooling compressor or fan 70 or power supply 90. It is preferred and distinctly advantageous to have a housing of some kind, even if only a relay rack, rather than an open (to the student operator) arrangement containing the following elements:

the rotating electrical machine 10 including its armature, coil, field coil, field coil housing and shaft (with the shaft or other coupler extending out of the housing)

the electrical energy applying means including the polarity reversing switch 20, internal-external excitation switch 30, machine mode switch 40, adjustable impedance armature controller 130, field controller 110

The front panel 101, 102 should have at least visible indicator portions of the measuring means — meters 82, 84, 85, 86, 71, 119, 139, 138, or so many of them as are used in a particular variation of the instrument, and the manual control elements of controllers 20, 111, 30, 132, 131, 40, 92, particularly 111 and 131.

The instrument cabinet should also contain the load cell arrangement 83 and the tachometer 81.

OPERATION

Some typical instrument operations are now described.

Operation as a Starting Motor

With the engine E under test connected to the dynamometer system, the switches are set as follows:

1. Field reversing switch 20 to torque +, excitation switch 30 to external excitation.
2. Range switch 132 to high load (i.e., closed)
3. Power switch 92 on,
4. Field resistor 111 and armature load resistor(s) 131 turned full up (0 resistance).

The engine E will be made to start by throwing the off-start-load mode switch 40 to the start position (blade 49 to terminal 41). These settings establish machine 10 as a motor and provide maximum cranking torque and minimum cranking speed. Decreasing the field resistance setting (by adjusting rheostat 111 will increase cranking speed. The power supply section 90 is energizing both field and armature of the machine 10 which thus acts as starting motor for engine E. The power supply 90 can also supply the engine battery functions via terminals 96, 136.

OPERATION AS A DYNAMOMETER

With the engine running, the field resistor 111 and armature resistors 131 are set in the minimum position (maximum resistance), the exciting switch 30 to external excitation position and the load range switch set to low by opening swtich 132. With the field reversing switch 20 in either position the engine may be loaded by throwing the mode switch 40 to the "Load" Position (blade 49 to terminal 43). The machine 10 is now a generator operating as an electromechanical dynamometer and the torque, speed, cylinder pressure, and manifold pressure of Engine E can now be read on meters 84, 82, 85. 86 and the generator output voltage and current can be read on meters 138 and 139. Meter 119 is available to read the exciting field current. Load on the Engine E can now be adjusted by turning up the field and armature rheostats (decreasing resistance). For higher loads the armature load range switch can be set to high by opening switch 132, further decreasing armature resistance. To increase stability when operating on the low speed part of the torque-speed curve, the switch 30 can be set to the internal excitating position thus producing a torque proportional to the speed squared.

Should higher torque be required at low speed than can be developed with the load resistor set to zero resistance (between 0 and 1200 RPM) the torque can be increased by setting the blade 49 of armature switch 40 to "Start" (terminal 42) and adjusting the field and armature rheostats to minimum resistance values. This means provides a usable torque up to the machine maximum own to zero speed.

Operation as D.C. Motor to Demonstrate the Operation of D.C. Machines

The FIG. 1–2 apparatus can also be used to illustrate the operating principles of D.C. motors and generators with machine 10 set into electrical motor or generator mode and with its electrical operating parameters varied as desired through the circuitry of the energy applying means and its mechanical operating parameters variable by changing the loading on shaft 19. The separate excitation of field and armature make possible varying armature voltage at constant field current and voltage, as well as at varying field current. Thus the student can see for himself the influence of these important parameters. The internal construction and operation can be viewed by the student through the transparent portions.

The useful experiments which the student can perform with the instrument of the apparatus include the following:

1. Measure horsepower at various speeds and plot a HP-rpm curve.
2. Measure torque at various speeds and plot a Torque-rpm curve.
3. Measure efficiency of the engine in as many different settings of engine operation as the engine allows.
4. Reading combustion pressure at various speeds and plotting compression against load.
5. Reading manifold pressure at different loads and speeds.
6. Using the instrument as a generator and reading power output and/or usually observing uses of the power output — lighting a lamp, running a fan, and other electrical devices.

In connection with (3) above, an engine which allows variation of compression ratio is particularly useful. A transparent cylinder engine would allow the student to correlate combustion color with efficiency.

It is also desirable to use a light engine (30 pounds or less) and mount it on a common frame with the instrument for portability.

It will be apparent to those skilled in the art that many changes — in addition to the variations stated above — can be made within the scope of the invention herein described. It is therefore intended that the above disclosure shall be read as illustrative and not in a limiting sense. The invention shall be construed as embracing each and every novel feature and novel combination of features present in or possessed by the apparatus and techniques herein disclosed and limited only by the spirit and scope of the appended claims.

What is claimed is:

1. A compact, portable, educational electromechanical dynamometer instrument with multiple alternative uses as an engine starter, a dynamic loading dynamometer for said engine and an electrical machine demonstrator comprising, means forming a rotating electrical machine with a machine housing, field coil means, armature and armature coil means and means forming an armature shaft, with a shaft axis, connected both to said engine with the said field coil means and armature coil means being constructed and arranged for electromagnetic interaction, means including bearings forming an instrument housing mounting said armature shaft for rotation, means mounting said machine housing for allowing limited rotational movement of said machine housing around said shaft axis to torque developed through electromagnetic interaction between said armature and field coil means, means for measuring the force produced upon occurrence of said limited rotational movement to provide a force signal, means for visually displaying a representation of the magnitude of said force signal, a source of electrical energy, means mounted on said instrument housing for applying electrical energy from said source to said armature coil means and said field coil means and comprising polarity-reversing switching means selectively operable to control the direction of rotational torque induced by interaction between said field coil means and armature coil means and comprising means forming a visual indication of the said torque, manually adjustable means for controlling the level of power applied to said armature and field coil means, means for providing a visual indication of electrical parameters related to the electrical energy applied to said armature and field coil means, and means for providing a visual indication of the speed of rotation of said armature shaft, and wherein said instrument housing comprises a panel walled enclosure, said rotating electrical machine, said electrical energy source, the electrical energy applying means and the means for providing a visual indication is mounted in said enclosure with the latter means projecting through a housing panel wall, and wherein said shaft axis, said manually adjustable means and visual indication means project through the instrument housing's panel walls.

2. An electromechanical instrument in accordance with claim 1 wherein said instrument housing comprises a transparent panel affording a view of said rotating electrical machine and other components inside the panel walls.

3. An electromechanical instrument in accordance with claim 2 wherein the means for providing a visual indication and mounted in said transparent panel.

4. An electromechanical instrument in accordance with claim 1 and further comprising, internal-external excitation switch means, as part of said energy applying means, switchable between internal mode and external mode settings to selectively provide field excitation current from said armature means in the internal mode and from said power supply in the external mode.

5. An electromechanical instrument in accordance with claim 4 for use as a compression engine starter and further comprising means for measuring the pressure and vacuum of said engine and comprising means for providing visual indications thereof mounted on the panel walls.

6. A portable electromechanical instrument in accordance with claim 4 and further comprising said engine mounted on a common housing threwith.

7. An electromechanical system in accordance with claim 6 wherein said switch means, said means for controlling and said means for providing a visible indication are mounted in a common panel for viewing by an operator.

8. An electromechanical system in accordance with claim 7 and wherein said engine is a compression engine of reciprocating internal combustion engine type having at least one engine cylinder and a manifold and further comprising, means for measuring the peak pressure of a cylinder in said engine and the vacuum of said engine manifold the latter means for measuring including visible indicator portions thereof mounted in said common panel for viewing by an operator.

9. An electromechanical dynamometer instrument system with multiple alternative uses as an engine starter, a dynamic loading dynamometer for said engine and an electrical machine demonstrator comprising, rotating electrical machine means having field means, and a housing therefor, armature means and armature shaft means connectable to said engine, the said field means and armature means being constructed and arranged for electromagnetic interaction, a source of electrical energy, means for applying electrical energy from said source to said armature means and said field means for selectively causing said electrical machine means to function as a motor for starting said engine and as a generator for controllably loading said engine, means for measuring the speed of rotation of said shaft, and means for measuring the torque on said armature shaft means comprising, load cell means for measuring the torque incident to rotary displacement of the housing of said rotating machine in at least one direction of rotation and constraining the said machine housing against rotation in said direction and means for constraining rotation of the housing in the other direction, the said machine housing being otherwise essentially free to rotate with respect to the armature shaft except as constrained by said constraining means, said engine coupled to said armature shaft in driving relation thereto, the engine being a compression engine of reciprocating, internal-combustion type with at least one cylinder and a manifold, means for controlling the excitation energy applied to said field means, adjustable impedance means electrically coupled to said armature means and constructed and arranged in controlling relationship with respect to said armature means, means for measuring cylinder pressure and manifold vacuum of said engine, means for measuring field current, armature current and armature voltage, an instrument housing having at least one panel and containing at least the said electrical machine means, said means for controlling field excitation energy, said adjustable impedance means, and visible indicator portions of said measuring means, the instrument housing mounting the said visible indicator means and manual control portions of said controlling and adjustable impedance means in a common panel, for viewing by an operator, the panel being constructed and arranged to also afford an operator view of the structure of said controlling and adjustable impedance means during operation.

10. An electromechanical system in accordance with claim 9 wherein said rotating electrical machine means is a d.c. machine and said source of electrical energy is a d.c. power supply and the system further comprising, polarity-reversing switching means contained in said housing for coupling said power supply to said field means to control the direction of rotational torque of said shaft means provided by the interaction between the field means and armature means magnetic fields.

11. An electromechanical system in accordance with claim 10 and further comprising, internal-external excitation switch means, as part of said energy applying means, switchable between internal mode and external mode settings and contained in said housing for coupling said power supply, field and armature means and said switch means being constructed and arranged to selectively provide field excitation current from said armature means in the internal mode and from said power supply in the external mode.

* * * * *